No. 634,469. Patented Oct. 10, 1899.
W. MAJERT.
TOOL FOR MAKING ACCUMULATOR PLATES.
(Application filed Mar. 25, 1897.)

(Model.)

Witnesses:
E. B. Bolton

Inventor:
Wilhelm Majert
By Richardson
his Attorneys.

UNITED STATES PATENT OFFICE.

WILHELM MAJERT, OF BERLIN, GERMANY.

TOOL FOR MAKING ACCUMULATOR-PLATES.

SPECIFICATION forming part of Letters Patent No. 634,469, dated October 10, 1899.

Application filed March 25, 1897. Serial No. 629,220. (Model.)

*To all whom it may concern:*

Be it known that I, WILHELM MAJERT, a subject of the Emperor of Germany, residing at Berlin, Germany, have invented certain new and useful Improvements in Tools for Making Accumulator-Plates, of which the following is a specification.

My invention is a tool for making accumulator-plates of a certain form in which the exposed surface of the plate is enlarged or increased by erecting a series of ribs from its surface with spaces or channels between the ribs.

Figure 1:
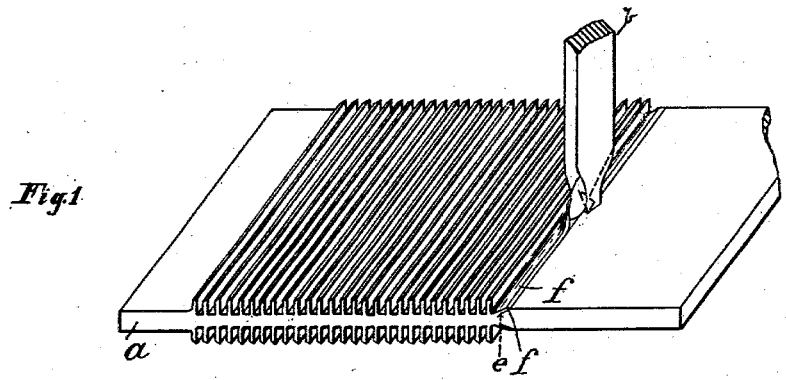
Figure 2:
Figure 3:
Figure 4:
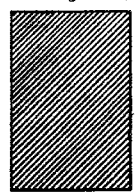
Figure 5:
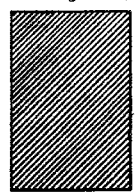
Figure 6:
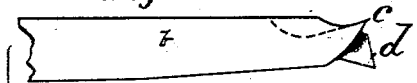
Figure 7:
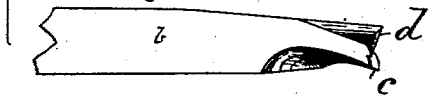

In the drawings, Figure 1 is a perspective view of a plate formed by my invention. Figs. 2, 3, 4, and 5 are front views of different accumulator-plates in which the grooves run differently. Fig. 6 is a side view of the tool. Fig. 7 is a view of the tool, looking from the opposite side of Fig. 6.

The tool comprises a bar $b$, having two working edges or points $c$ $d$. The purpose of the tool is to cut a strip of material $f$ from the face of the plate, leaving it, however, attached at one edge $e$, and then erecting this strip to form a rib, such as is shown in Fig. 1, this figure illustrating a number of the ribs erected parallel with each other and with grooves between them. The edge $c$ operates in advance of the edge $d$ both laterally and longitudinally.

The tool cuts with its edge $c$ into the material of the plate and detaches from it the strip $f$, which still adheres to it at its base $e$. The slanting edge $d$ behind the edge $c$ then engages the under side of the detached strip in such a manner that the projecting edge enters first under the strip. As the surface behind the edge $d$ is wedge-shaped, the detached strip is erected by it. These two edges $c$ and $d$ work simultaneously, so that the edge $c$ completes the cut with one movement, while in the same movement the edge $d$ erects the strip which was cut by the preceding movement of the tool. The edges $c$ and $d$ work at different places, though connectedly, during their movement. The one edge gives a preliminary action—that is, it detaches the strip from the plate. The other edge completes the work by erecting the detached strip so as to form a rib.

The tool may have only one edge with one bending-surface.

I claim—

1. A tool for forming ribs on accumulator-plates having an edge $c$ for cutting a strip from the plate, and a second cutting edge $d$ for erecting the same, said edges being relatively located so that the edge $d$ erects the strip previously cut by the edge $c$ and while the said edge $c$ is cutting a new strip, substantially as described.

2. A tool for forming ribs on accumulator-plates having an edge $c$ for cutting a strip from the plate, and a second cutting edge $d$ for erecting the same, said edges $c$, $d$, being displaced laterally in relation to each other, whereby the edge $c$ will be cutting one strip while the edge $d$ is erecting the strip previously cut, substantially as described.

In witness whereof I have hereunto set my hand in presence of two witnesses.

WILHELM MAJERT.

Witnesses:
 HENRY HASPER,
 W. HAUPT.